United States Patent
Masnik

[15] 3,662,599
[45] May 16, 1972

[54] MASS FLOWMETER

[72] Inventor: Walter Masnik, 11 Cecil Court, Cedar Grove, N.J. 07009

[22] Filed: Mar. 31, 1970

[21] Appl. No.: 24,322

[52] U.S. Cl. .................................................. 73/205 D
[51] Int. Cl. ........................................................ G01f 1/00
[58] Field of Search .................................... 73/205 D

[56] References Cited

UNITED STATES PATENTS

| | | | |
|---|---|---|---|
| 3,232,105 | 2/1966 | Fishman et al. | 73/205 |
| 3,371,530 | 3/1968 | Howe | 73/205 |
| 3,232,104 | 2/1966 | Fishman et al. | 73/205 |

*Primary Examiner*—Richard C. Queisser
*Assistant Examiner*—John P. Beauchamp
*Attorney*—Edwin E. Greigg

[57] ABSTRACT

An extended viscosity range mass flowmeter comprising a pair of branch conduits connecting inlet and outlet conduits. The branch conduits each have a pair of flow restrictors comprising identical orifices with one edge sharp and the other rounded and oriented with their like edges in opposition in proceeding from inlet to outlet conduits. A constant volumetric recirculating pump connects the two branch conduits at points intermediate the orifices therein. A differential pressure measuring device is automatically connected between the inlet and outlet conduits or between the points intermediate the restrictors in each conduit depending upon whether the recirculating flow is greater or less than the measured flow.

14 Claims, 9 Drawing Figures

REVERSIBLE ORIFICES

MASS FLOWMETER

This invention relates to apparatus adapted to measure rate of flow of fluids and more particularly relates to flowmeters adapted to measure mass flow rate in a linear manner.

In certain types of mass rate flowmeters, recirculation pumps or other devices are used to add and subtract a given volumetric flow of fluid to the flow under measurement. The meter is essentially a differential pressure type meter which measures the differential pressure across a flow restrictor or restrictors attributed to the addition and subtraction of fluid. The subject invention is an improved flowmeter of this type.

In U.S. Pat. No. 3,232,104, issued Feb. 1, 1966, there is described a mass flowmeter comprising a pair of branch conduits connecting inlet and outlet conduits in which the flow is to be measured, said branch conduits each having a pair of orifices, and a constant volume recirculating pump connecting said two branch conduits at points intermediate the orifices therein.

According to an embodiment in said prior patent, all four orifices have the same flow characteristics, i.e., the products of discharge coefficient and cross sectional area of each orifice is the same. By proper placement of a measuring device the mass flow rate can be read as a linear function rather than as a non-linear function of the pressure differential as measured by said device. This arrangement has the further advantage that pulsating and irregular flows can be measured much more accurately than in the conventional differential pressure flowmeter. However, as mentioned, said device requires four orifices of the same flow characteristic.

According to the U.S. Pat. No. 3,232,105, issued Feb. 1, 1966, mass flow can be measured accurately by providing two matched pairs of flow restrictors in which each of the flow restrictors in a pair has the same flow characteristics as the other restrictor in that pair, but the restrictors in one pair do not have the same flow characteristics as the restrictors in the other pair. When measuring very viscous fluids or operating at low Reynolds numbers the flow coefficients of the orifices will change and affect the accuracy of the flowmeter. However, by preselecting the sizes, shapes and relationships of these matched pairs of orifices it is possible to obtain a mass flowmeter reading over a range of viscosities by so choosing the pairs so that the flow coefficients of one pair, comprising, for example, rounded edge orifices, will increase with a specified change in viscosity of the measured fluid at the same time that the flow coefficients of the other pair, comprising, for example, sharp edged orifices, will decrease.

A review of the aforementioned patents will reveal that for a measured flow rate greater than the recirculating flow rate, the differential pressure is measured across a specific two of said flow restrictors in order to obtain an indication which varies linearly with the mass flow rate of fluid passing through the flowmeter. If the measured flow rate should for some reason become less than the recirculating flow rate, then the differential pressure needs to be measured across a different two of said flow restrictors in order to obtain an indication which varies linearly with the mass flow rate of fluid passing through the flowmeter. If one were merely to change the connection of the differential pressure instrument to obtain linear readings over a range which varies from the measured flow rate being greater than, to less than the recirculating flow rate, difficulties are encountered. It should be noted that the mass flow rate changes direction in certain of the orifices for the two relationships, and that in aforementioned U.S. Pat. No. 3,232,105, the coefficients of the orifices were proper and matched for only one direction of flow. In order to permit linear measurements over the complete range, therefore, the restrictors need to have their coefficients proper and matched for both directions of flow.

It is an object of this invention to provide an extended range flowmeter which uses differential pressure transducer means to obtain a linear indication of mass flow rate of fluids.

It is another object of this invention to provide an improved flowmeter which uses a single differential pressure indicator or transducer for sensing differential pressure across two flow restrictors.

It is another object of this invention to provide an improved flowmeter which accurately measures transient or pulsating flow as well as steady flow.

It is another object of this invention to provide an improved flowmeter which is inexpensive, simply constructed and requires a minimum of maintenance.

A further object of this invention is to provide an extended range mass flowmeter of the type comprising a constant volume recirculating pump and a pair of conduits by passing said pump wherein each of said conduits contains a pair of orifices of predetermined flow characteristics.

A fuller understanding of the invention may be had by reference to the following description and claims taken in conjunction with the accompanying drawings in which:

Figure 1:
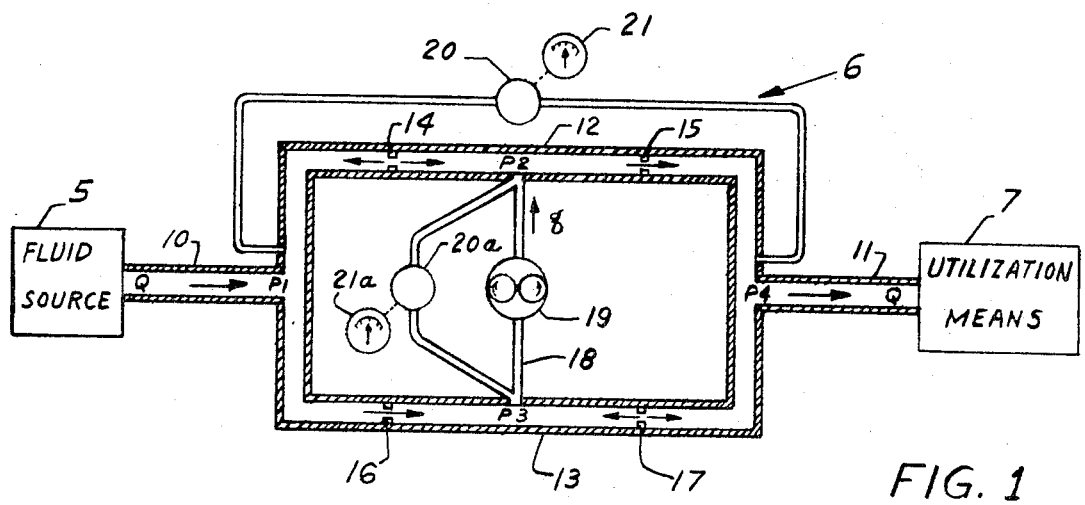
FIG. 1 is a schematic drawing of a flowmeter utilizing four flow restrictors, a constant volume recirculating pump and a differential pressure indicator or transducer. The flowmeter is a design which renders it useful for measuring flow which may be less than or greater than the volume recirculated by the recirculating pump.
Figure 5:
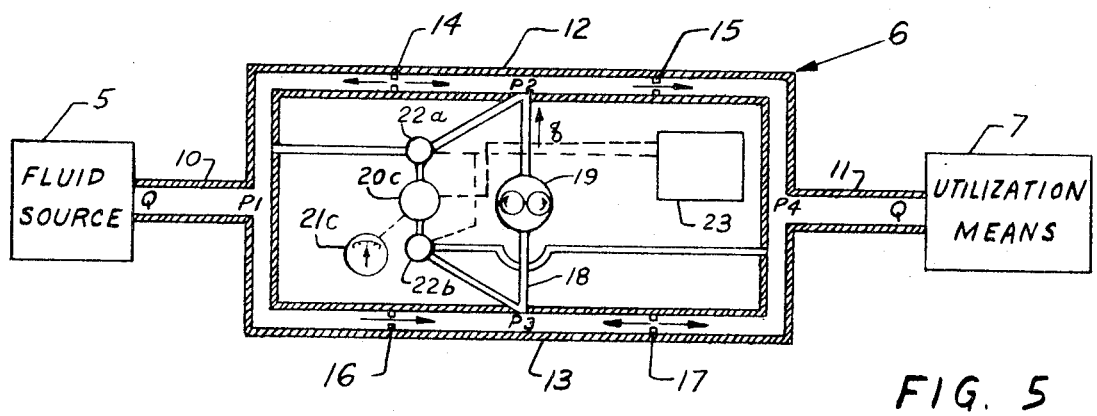

FIG. 5 discloses an arrangement permitting certain advantages over the arrangement of FIG. 1 by employing a single pressure differential measuring device and which may be operated manually or automatically.

Figure 6:
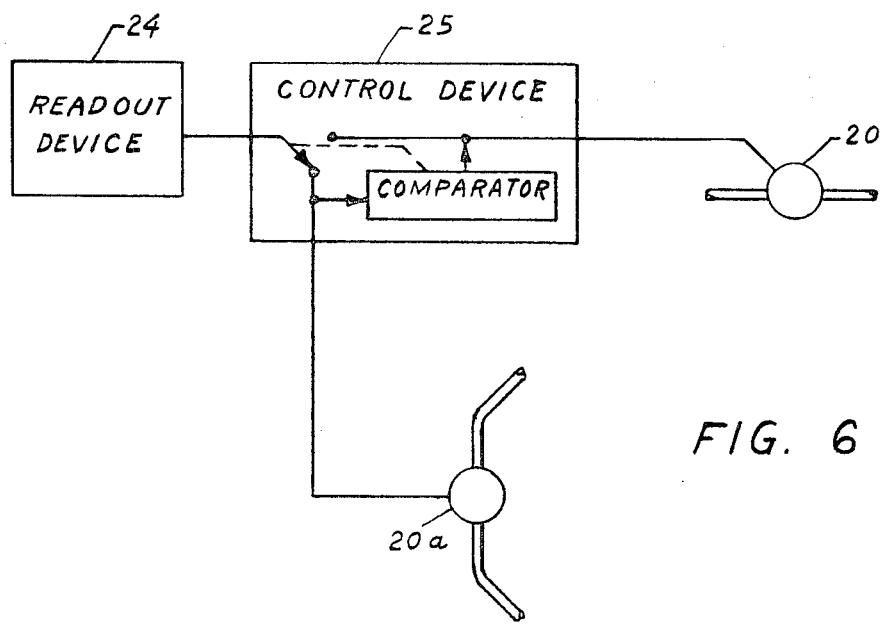

FIG. 6 discloses a control for automatically switching differential pressure measuring devices for wide range measuring applications.

Referring now to FIG. 1, 10 is an inlet conduit whose volumetric flow rate $Q$ of fluid from a source 5 such as a tank to a utilization means 7 such as an engine, is to be measured by the flowmeter of this invention. Outlet conduit 11 has a volumetric flow identical to that in the conduit 10. Branch conduits 12 and 13 connect inlet conduit 10 with said outlet conduit 11. Branch conduit 12 contains two flow restrictors 14 and 15, for example in the form of orifices, which will be designated as the first and second flow restrictors throughout this specification, and branch conduit 13 contains two flow restrictors 16 and 17 which will be designated as the third and fourth flow restrictors throughout this specification. A recirculation conduit 18, containing a constant volume recirculating pump 19, connects branch conduit 12 at a point intermediate restrictors 14 and 15 with branch conduit 13 at a point intermediate restrictors 16 and 17. Pump 19 recirculates fluid at a constant volumetric flow rate $q$ which may be greater or less than flow $Q$ in conduit 10. Where the constant volumetric flow rate $q$ is greater than the measured flow rate $Q$, a differential pressure measuring device or transducer 20 having gauge 21 measures the differential pressure between a point or location upstream of pump 19 such as the junction of inlet conduit 10 with branch conduits 12 and 13 and a point or location downstream of pump 19 such as the junction of outlet conduit 11 with branch conduits 12 and 13. For convenience, these points will be designated P1 and P4 respectively. Points P2 and P3 respectively will designate the junction between recirculation conduit 18 and branch conduits 12 and 13 respectively. It should be noted that for a measured volumetric flow rate $Q$ less than the recirculating volumetric flow rate $q$, if the differential pressure were measured between points P2 and P3, the indications on gauge 21 would not vary linearly with mass flow rate as is the case where the measurements are made between points P1 and P4.

However, where the constant volumetric flow rate $q$ is less than the measured flow rate $Q$, the differential pressure measurement is made by device or transducer 20a having gauge 21a between points P2 and P3, that is, the junction of recirculation conduit 18 with branch conduits 12 and 13 respectively. In this instance, were the measurements to be made between points P1 and P4, the measurement gauge would not vary linearly with the mass rate of flow or fluid flowing through the flowmeter.

A review of the teachings of U.S. Pat. No. 3,232,105 will reveal that in the embodiment wherein the differential measurements are made by 20 and 21, the first and second restrictors 14 and 15 respectively have the same flow characteristics. The third and fourth restrictors 16 and 17 also have their own identical flow characteristics which are not the same as the flow characteristics as restrictors 14 and 15. On the other hand, where the linear measurements are taken by transducer 20a and the gauge 21a, the first and third restrictors 14 and 16, have the same or matched flow characteristics and the second and fourth restrictors 15 and 17, have the same flow characteristics which are different from the flow characteristics of restrictors 14 and 16. In accordance with well-known practices, the cross-sectional areas of the conduits are kept sufficiently large resulting in relatively low fluid velocities such that mixing losses and pressure inconsistencies between orifices or flow restrictors 14 and 15 and between 16 and 17 are not significant.

It can be shown that:

$$\Delta P_{1-4} = \frac{2q/g}{(C_1A_1)^2 + (C_2A_2)^2}(sQ) = KM$$

where:
C = flow restrictor coefficient
A = flow area of restrictor
$\Delta P$ = differential pressure
s = density
g = gravity constant
Q = measured volumetric flow rate
q = a recirculating volumetric flow rate
K = a constant
M = mass flow rate This relationship is true where the recirculating flow rate $q$ is greater than the measured flow rate $Q$. It is seen that the differential pressure $\Delta P_{1-4}$ is directly proportional to the mass flow rate passing through conduits 10 and 11.

Similarly, it can be shown that:

$$\Delta P_{2-3} = \frac{2q/g}{(C_1A_1)^2 + (C_2A_2)^2}(sQ) = KM$$

This shows that where the recirculating flow $q$ is less than the measured flow $Q$, the differential pressure $\Delta P_{2-3}$ is directly proportional to the mass flow rate passing through conduits 10 and 11.

Figure 3:
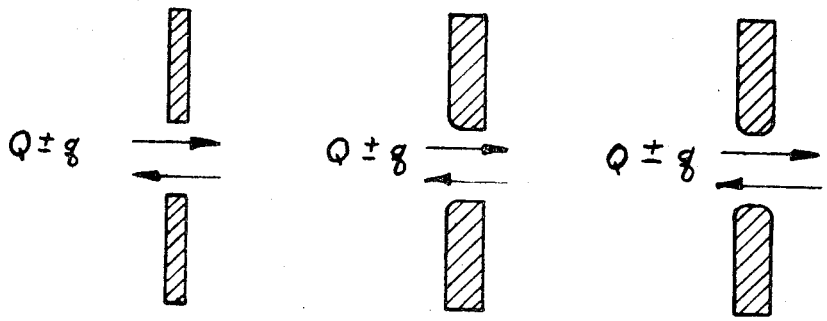
FIG. 3A through 3C illustrate various orifice designs useful in practicing the present invention.
Figure 2:
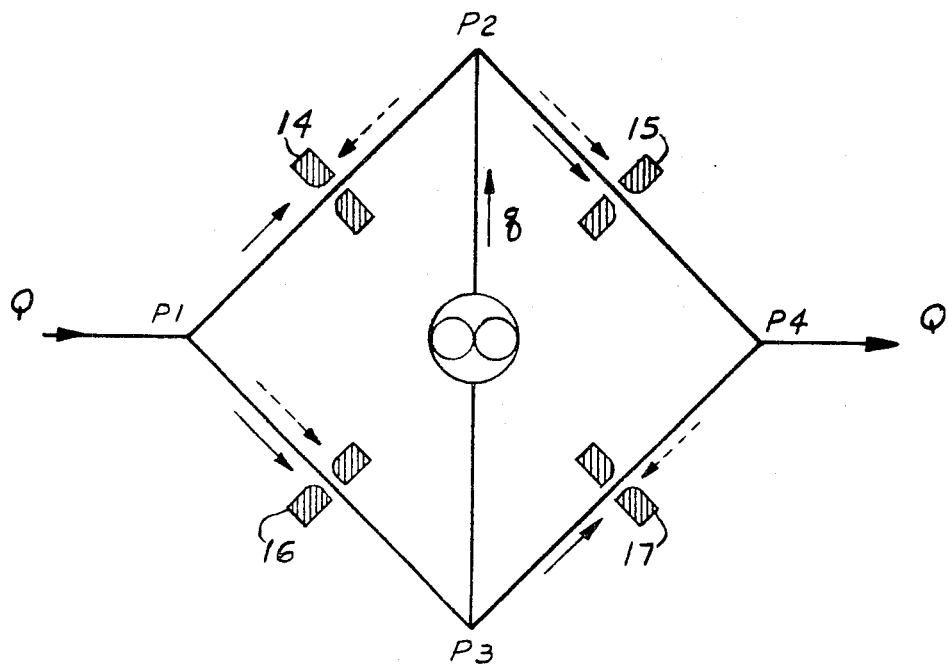
FIGS. 2 and 4 illustrate graphically certain principles useful in explaining the present invention.
Figure 4:
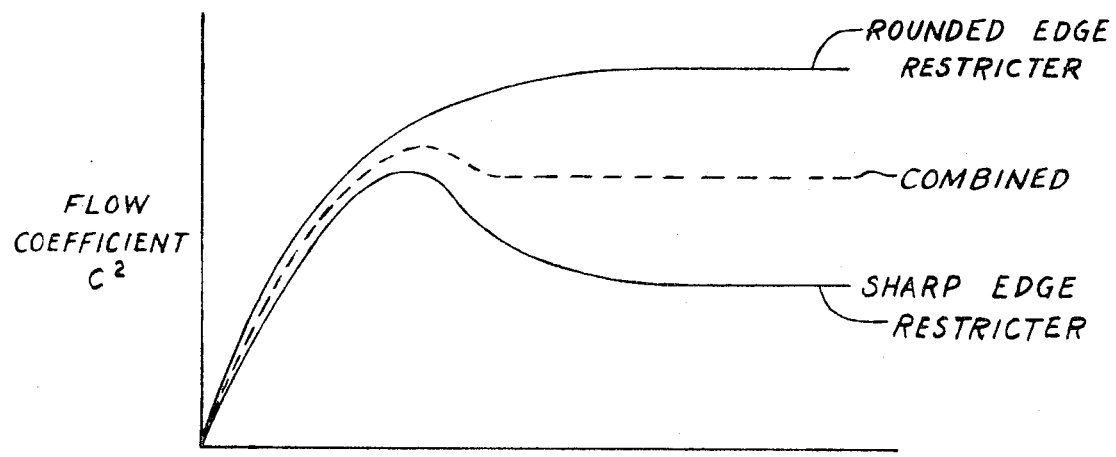

It should be noted, as perhaps most clearly indicated in the mathematical analysis of U.S. Pat. No. 3,232,104, that point $P_1$ represents the pressure on one side of restrictor 14 as well as one side of restrictor 16, that $P_2$ represents the pressure on one side of restrictor 14 as well as one side of restrictor 16, that $P_3$ represents the pressure on one side of restrictor 16 as well as one side of restrictor 17 and $P_4$ represents the pressure on one side of restrictor 15 as well as one side of restrictor 17. Thus the differential pressure between points 2 and 3 in this system may be defined in various ways; for example, (1) as a pressure drop between a location in one branch intermediate two restrictors and a location in the other branch between two restrictors, or (2) as a pressure drop across two restrictors (i.e. the pair 14 and 16 or the pair 15 and 17). Similarly, the differential pressure between points 1 and 4 in this system may be described as a pressure drop between (1) locations upstream and downstream of the restrictors or (2) as a pressure drop across two restrictors (i.e. the pair 14 and 15 or the pair 16 and 17). Referring again to FIG. 1, it has been shown that for $q$ greater than $Q$, the differential pressure measured between inlet and outlet conduits, such as points $P_1$ and $P_4$, varies linearly with changes in the mass flow rate $M$ (where $M=Qs$). This linearity for measurements between points $P_1$ and $P_4$ exists for $q$ greater than $Q$. When $Q$ exceeds $q$, the differential pressure measured at the inlet and outlet conduits no longer varies linearly with mass flow rate. However, the differential pressure measured at the intermediate points $P_2$ and $P_3$ now varies linearly with changes in mass flow rate. Thus, it would appear that one need merely change the connection of the differential pressure gauge to obtain linear reading over a range from $q$ greater than $Q$ to $q$ less than $Q$. However, it should be noted that the volumetric flow changes direction in certain of the branch conduits as $q$ is less than or greater than $Q$ for the direction of $q$ pumping by 19 shown in FIG. 1. FIG. 2 illustrates the direction of fluid flow in the branch conduits by arrows. The arrows in dotted line show the flow direction for q greater than $Q$ and the arrows in solid line show the flow direction for $q$ less than $Q$. Thus, it should be noted that the volumetric flow changes direction in portions of the branch conduits, at least those portions of the flow that pass through the first and fourth orifices, i.e., where the recirculating flow $q$ shown in FIG. 1 opposes the throughput flow. It should be recalled that restrictors in the previously disclosed patents had coefficients which were proper and matched for one direction of flow. In order to permit linear measurement over the complete range (i.e., of $q$ less than or greater than $Q$), the restrictors 14 and 17 need to have their coefficients proper and matched for both directions of flow. However, it should be noted that if restrictors 14 and 17 were bidirectional and restrictors 15 and 16 were unidirectional, an unbalance would occur when the differential pressure is measured between $P_2$ and $P_3$, i.e., between intermediate points in the branch conduits. Therefore, in order to permit bidirectional flow in orifices 14 and 17 and matched orifices (i.e., coefficients) for 14 and 16, and for 15 and 17 for $q < Q$ as well as matched orifices for 14 and 15, and for 16 and 17 for $q > Q$, one can use identical orifices which have inlet and outlet edges that are sharp, as shown in FIG. 3A or identical orifices which have inlet and outlet edges that are rounded as shown in FIG. 3C. In the case of the all sharp and all rounded edge orifices, or restrictors the flow coefficients differ with low Reynolds numbers as shown in FIG. 4, thereby limiting the range of linear mass flow measurements. However, the combined flow coefficient curves have an improved characteristic at the low Reynolds number such that by making use of both sharp and rounded edge characteristics the range of linear measurements can be substantially extended as shown in FIG. 4. Thus, by making all orifices identical but with each orifice having one edge sharp and the other rounded as shown in FIG. 3B and the orifices oriented such that for $q$ less than $Q$ where the differential pressure is measured between $P_2$ and $P_3$, the flow through restrictors 14 and 16 proceeds from a rounded edge, to a sharp edge and the flow through restrictors 15 and 17 proceeds from a sharp edge to a rounded edge the range of linear measurements can be extended. For $q$ greater than $Q$, where the differential pressure is measured between inlet and outlet conduits, i.e., $P_1$ and $P_4$, the flow through restrictors 14 and 15 proceeds from sharp edges to rounded edges and through restrictors 16 and 17 proceeds from rounded to sharp edges. That is, the orifices are oriented such that the orifices in each pair are identically oriented with their like edges in opposition in proceeding from inlet to outlet conduits.

However, depending on the needs, the orifices can be all the same and have both edges sharp or both edges round, or have one edge sharp and the other edge round and properly oriented. Since it is simpler to make all orifices the same, all orifices have one edge sharp and the other edge round for extended range operation.

Whereas the arrangement of FIG. 1 required the use of two transducers 20 and 20a and two gauges 21 and 21a, FIG. 5 shows how valves 22a and 22b can, by means of a control 23 either automatically or manually operated, be used to switch a single differential pressure sensor 20c from points $P_1$, $P_4$ to $P_2$, $P_3$ and use a single readout 21c. In this embodiment control means 23 comprises a motive means which responds to signals from differential pressure sensor 20c to operate valves 22a and 22b to connect sensor 20c either to pressure measuring points 2 and 3 or pressure measuring points 1 and 4, the points 1 and 2 being high pressure points and the points 3 and 4 being low pressure points, the high pressure points being connected to the high pressure connection of sensor 20c and the low pressure points being connected to the low pressure connection of 20c. When sensor 20c senses a mass flow rate having a magnitude greater than the magnitude corresponding to the recirculating mass flow rate, it produces a signal to cause control means 23 to operate the valves to connect the sensor to points 2 and 3 and when it senses a mass flow rate having a magnitude less than the recirculating mass flow rate, it produces a signal to cause control means 23 to operate the valves to connect the sensor to points 1 and 4. Thus, the sensor and readout means 21c always are connected across the pairs of restrictors where the differential pressure varies linearly with changes in the mass flow rate through the flowmeter. The recirculating mass flow rate $sq$ is considered a constant value even though $s$ may vary. In order to establish a constant value for $sq$ an average value of the expected variation of $s$ is taken. Unless $s$ varies radically this does not introduce any significant error in measurement.

FIG. 6 illustrates an arrangement involving a single readout device 24 for both sensors 20 and 20a. Control device 25 comprises a comparator for comparing the magnitudes of the signals available from differential pressure measuring devices or sensors 20 and 20a to control the switching of the appropriate sensor output over a selector switch to the readout device 24.

As previously explained, sensor 20 provides a linearly varying reading only when $Q < q$ and sensor 20a provides a linearly varying reading only when $Q > q$. As explained in greater detail in U.S. Pat. No. 3,232,104 (see top of col. 5) $\Delta P_{1-4}$ and $\Delta P_{2-3}$ (and therefore the readings from sensors 20 and 20a) are the same only when $q = Q$; for other conditions of flow, these pressure drops are unequal since at any other condition of flow one varies linearly and the other non-linearly. From an inspection of FIG. 2 it becomes clear that for any condition of flow in which $Q \neq q$, the signal from sensor 20 which senses $\Delta P_{1-4}$ will be smaller than the signal from sensor 20a which senses $\Delta P_{2-3}$ when $Q < q$, and the signal from sensor 20a which senses $\Delta P_{2-3}$ will be smaller than the signal from sensor 20 when $Q > q$. This is so because, as shown in that figure, when $Q < q$, the dotted line flow measured across $P_1$ and $P_4$ is in opposing directions across orifices 14 and 15 and also across orifices 16 and 17 as compared to additive directions across the pair of orifices 14 and 16 and the pair of orifices 15 and 17 when measured across $P_2$ and $P_3$ and when $Q > q$, the solid line flow measured across $P_2$ and $P_3$ is in opposing directions across orifices 14 and 16 and also across orifices 15 and 17 as compared to additive directions across the pair of orifices 14 and 15 and the pair of orifices 16 and 17 when measured across $P_1$ and $P_4$. Thus, the comparator will operate to associate the readout device 24 with that sensor 20 or 20a which is giving the smallest signal. In the unusual case where $q = Q$ and both signals are equal, the comparator will not make a choice and the readout device will remain connected to whichever sensor it was last connected to.

Although the invention has been described with a certain degree of particularity, it is understood that the disclosure has been made only by way of example and that numerous changes in the details of construction of the combination of arrangement and arrangement of parts may be resorted to without departing from the spirit and scope of the invention as hereinafter claimed.

What I claim as new and desire to secure by Letters Patent of the United States is:

1. A mass flowmeter adapted to measure the mass flow rate of fluid passing therethrough comprising an input end and an output end and means comprising separate first and second branch conduits connected between said input and output ends for providing a path of flow for said fluid from said input to said output ends, a first and second flow restrictor disposed in said first conduit along the path of flow therethrough, a third and fourth flow restrictor disposed in said second conduit along the path of flow therethrough, means for pumping fluid at a constant volumetric flow rate between said first conduit at a location intermediate said first and second flow restrictors and said second conduit at a location intermediate said third and fourth flow restrictors, the differential pressure across a pair of said restrictors varying linearly with changes in the mass flow rate through the flowmeter when the flow rate of fluid passing through the flowmeter is greater than the pumped flow rate and the differential pressure across another pair of restrictors varying linearly with changes in the mass flow rate of fluid passing through the flowmeter when the flow rate of fluid passing through the flowmeter is less than the pumped flow rate, means for measuring the differential pressure across said pairs of restrictors, readout means associated with the differential pressure measuring means, and means responsive to signals from said differential pressure measuring means for selectively causing said readout means always to indicate the mass flow rate sensed by the means measuring the differential pressure where it varies linearly with changes in the mass flow rate of fluid passing through the flowmeter.

2. A mass flowmeter adapted to measure the mass flow rate of fluid flowing therethrough independently of changes in the density of said fluid comprising first means for dividing the fluid flowing therethrough into separated, flowing, first and second parts, second means for recombining the fluid flowing in said first and second parts into a common flowing part, said first part comprising a first and second flow restrictor in spaced apart relationship, said second part comprising a third and fourth flow restrictor in spaced apart relationship, each of said flow restrictors having one edge sharp and the other edge rounded with the restrictors being oriented such that the restrictors in each part are oriented in opposition in proceeding in any one direction around the closed path circumscribed by said first and second parts, means operating independently of changes in density of fluids flowing through said first and second parts for pumping fluids at a constant volumetric flow rate between said first part at a location intermediate said first and second flow restrictors and said second part at a location intermediate said third and fourth restrictors and means for providing a linear indication of changes in said mass flow rate of fluid comprising means for selectively measuring the differential pressure across the two of said flow restrictors where the differential pressure varies linearly with the mass flow rate of fluid flowing through the flowmeter.

3. A mass flowmeter adapted to measure the mass flow rate of fluid passing therethrough comprising a main conduit, a pair of branched conduits interconnected to said main conduit intermediate the ends thereof, a first pair of flow restrictors comprising a first and second flow restrictor disposed in said first conduit along the path of flow therethrough, a second pair of flow restrictors comprising a third and fourth flow restrictor disposed in said second conduit along the path of flow therethrough, means for recirculating fluid at a constant volumetric flow rate between said first conduit at a location intermediate said first and second flow restrictors and said second conduit at a location intermediate said third and fourth restrictors, means responsive to the differential pressure across two of said flow restrictors for providing an indication of said measured mass flow rate of fluid passing through said flowmeter and means responsive to a signal from said differential pressure indicating means that said measured mass flow rate is less than said recirculating mass flow rate for connecting said indicating means between upstream and downstream sections of said main conduit and responsive to a signal from said differential pressure indicating means that said measured mass flow rate is greater than said recirculating mass flow rate for connecting said indicating means between a location in one branch conduit intermediate one pair of flow restrictors and a location in the other branch conduit intermediate the other pair of flow restrictors.

4. An arrangement according to claim 3 wherein said differential pressure indicating means comprises at least one differential pressure sensor and indicator.

5. An arrangement according to claim 1 wherein said means for measuring the differential pressure across the two of said flow restrictors where the differential pressure varies linearly with changes in the mass flow rate being measured comprises a pressure differential measuring device having a high pressure connection and a low pressure connection, first valve means for selectively connecting said high pressure connection to said first conduit at a location intermediate said first and second flow restrictors or to the input end, and second valve means for selectively connecting said low pressure connection to said second conduit at a location intermediate said third and fourth flow restrictors or to the output end.

6. A mass flowmeter adapted to measuring the mass flow rate of an effectively incompressible fluid passing therethrough comprising inlet and outlet conduits having a flow which is to be measured, first and second branch conduits connecting said inlet and outlet conduits, first and second flow restrictors in said first branch conduit, third and fourth flow restrictors in said second branch conduit, a pump pumping a given constant volumetric flow rate independently of changes in density of said fluid connecting said first and second branch conduits at points between the flow restrictors therein, each of said restrictors being defined by two edges, said first, second, third and fourth restrictors having one edge sharp and the other edge rounded, said first and second restrictors being oriented such that the sharp edges are oriented in opposition in proceeding from inlet to outlet conduits, said third and fourth restrictors being oriented such that said sharp edges are oriented in opposition in proceeding from inlet to outlet conduits, and the restrictors in the first branch conduit and in the second branch conduit having their sharp edges oriented in the same manner in proceeding from inlet to outlet conduits, and means for selectively measuring the differential pressure across two of said flow restrictors where the differential pressure varies linearly with changes in the mass flow rate of fluid flowing through said flowmeter.

7. A Mass Flowmeter adapted to measuring the mass flow rate of an effectively incompressible fluid passing therethrough comprising inlet and outlet conduits having a flow which is to be measured, first and second branch conduits connecting said inlet and outlet conduits, first and second flow restrictors in said first branch conduit, third and fourth flow restrictors in said second branch conduit, a constant volumetric pump pumping a given constant volumetric flow rate independently of changes in density of said fluid connecting said first and second branch conduits at points between the flow restrictor therein, each of said restrictors being defined by two edges, said first, second, third and fourth restrictors having one of their edges identical and having their other of their edges identical, means for measuring the differential pressure across flow restrictors, and means responsive to the relative magnitudes of the measured mass flow rate of fluid and said recirculating mass flow rate for connecting said differential pressure measuring means across the two of said flow restrictors where the differential pressure varies linearly with changes in the mass flow rate of fluid flowing through said flowmeter.

8. An arrangement according to claim 7 wherein said flow restrictors have all of their edges sharp.

9. An arrangement according to claim 7 wherein said flow restrictors have all of their edges rounded.

10. An arrangement according to claim 7 wherein said flow restrictors have one edge sharp and the other edge rounded, said first and second restrictors being oriented such that the sharp edges are oriented in opposition in proceeding from inlet to outlet conduits, said third and fourth restrictors being oriented such that said sharp edges are oriented in opposition in proceeding from inlet to outlet conduits, and the sharp edges in the first branch conduits and in the second branch conduits having their sharp edges oriented in the same manner in proceeding from inlet to outlet conduits.

11. A mass flowmeter adapted to measuring the mass flow rate of an effectively incompressible fluid passing therethrough comprising inlet and outlet conduits having a flow which is to be measured, first and second branch conduits connecting said inlet and outlet conduits, first and second flow restrictors in said first branch conduit, third and fourth flow restrictors in said second branch conduit, a constant volumetric pump pumping a given constant volumetric flow rate independently of changes in density of said fluid connecting said first and second branch conduits at points between the flow restrictor therein, each of said restrictors being defined by two edges, said first, second, third and fourth restrictors having one of their edges identical and having their other of their edges identical, means for measuring the differential pressure across flow restrictors, said differential pressure measuring means comprising a first and second differential pressure signal sensor and a common readout device, means for connecting one of said sensors between a point intermediate the pair of restrictors in said first conduit and a point intermediate the pair of restrictors in said second conduit, means for connecting the other sensor between points in said inlet and outlet conduits, and means for comparing the magnitudes of the pressure signals from said sensors for connecting said readout device to the sensor where the differential pressure varies linearly with changes in the mass rate of fluid flowing through said flowmeter.

12. An arrangement according to claim 11 wherein all of the edges are sharp.

13. An arrangement according to claim 11 wherein all of the edges are rounded.

14. An arrangement according to claim 11 wherein said flow restrictors have one of their edges sharp and the other rounded, said first and second restrictors having their sharp edges oriented in opposition in proceeding from inlet to outlet conduits, said third and fourth restrictors having their sharp edges oriented in opposition in proceeding from inlet to outlet conduits, and the orientation of the sharp edges in the first and second branch conduits being the same in proceeding from inlet to outlet conduits.

* * * * *